United States Patent [19]
Rau

[11] Patent Number: 5,988,008
[45] Date of Patent: Nov. 23, 1999

[54] DEVICE FOR SHIFTING BICYCLE GEARS

[75] Inventor: Johannes Rau, Schweinfurt, Germany

[73] Assignee: SRAM Deutschland GmbH, Schweinfurt, Germany

[21] Appl. No.: 09/132,625

[22] Filed: Aug. 11, 1998

[30] Foreign Application Priority Data

Aug. 11, 1997 [DE] Germany .............................. 197 34 683

[51] Int. Cl.⁶ ................................ F16C 1/10; G05G 1/04; G05G 11/00
[52] U.S. Cl. .......................... 74/473.1; 74/502.2; 74/527; 74/489
[58] Field of Search .................... 74/502.2, 527, 74/473.13, 489, 495; 464/77

[56] References Cited

U.S. PATENT DOCUMENTS

| | | | |
|---|---|---|---|
| 5,476,019 | 12/1995 | Cheever et al. | ........................ 74/489 X |
| 5,524,501 | 6/1996 | Patterson et al. | ..................... 74/489 X |
| 5,676,020 | 10/1997 | Jordan et al. | ......................... 74/489 X |

FOREIGN PATENT DOCUMENTS

| | | | |
|---|---|---|---|
| 1011306 | 6/1957 | Germany | ................................. 74/489 |
| 44 42 953 | 2/1996 | Germany . | |

*Primary Examiner*—Tamara L. Graysay
*Assistant Examiner*—Colby Hansen
*Attorney, Agent, or Firm*—Cohen, Pontani, Lieberman & Pavane

[57] ABSTRACT

A device for shifting bicycle gears. The device includes a housing part and a rotary element. The housing part has a circumferential surface and a plurality of notches formed in the circumferential surface. Each of the plurality of notches corresponds to a gear-shifting position. The rotary element has a circumferential wall and is selectively rotatable relative to the housing part, the housing part being disposed concentrically within the circumferential wall of the rotary element. The device further includes a detent spring configured as a wrap spring and arranged circumferentially around the housing part, the wrap spring having a wrap diameter and a wrap angle of between approximately 180° and 360°.

7 Claims, 1 Drawing Sheet

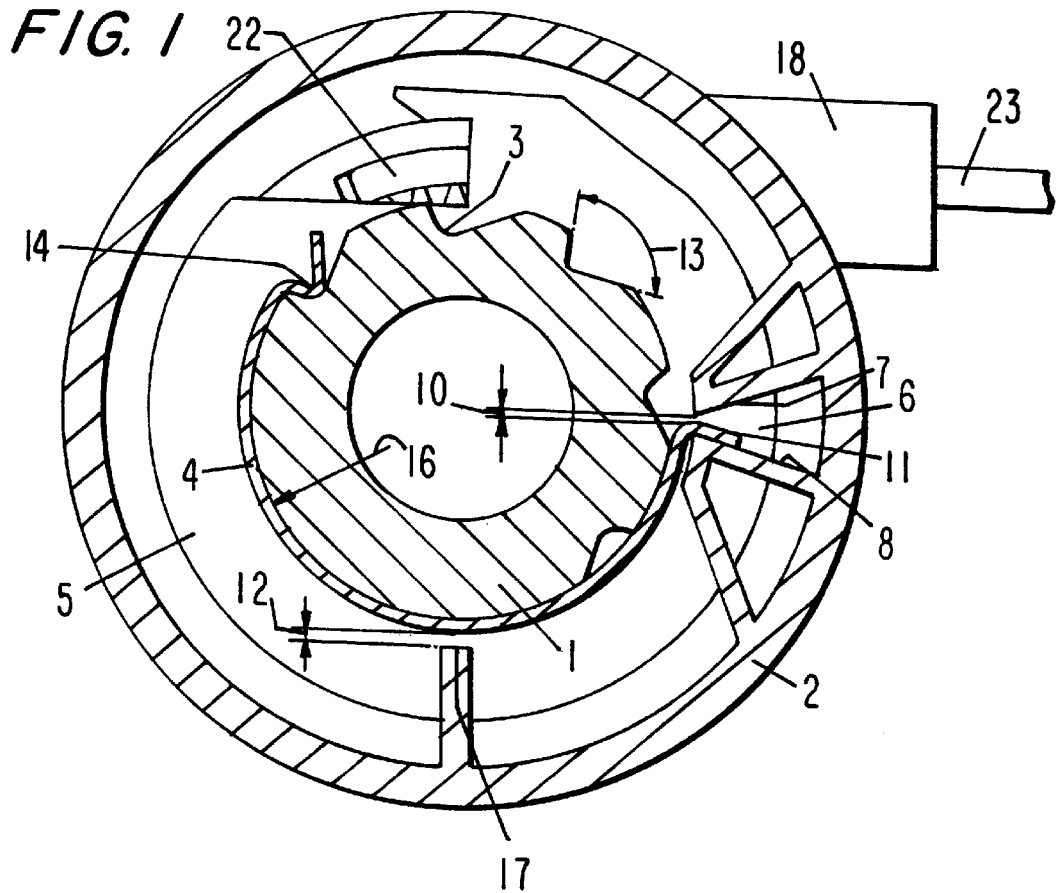
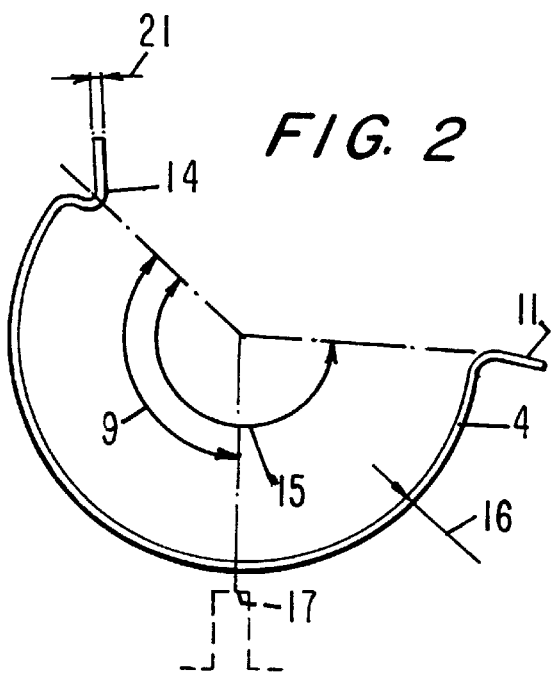
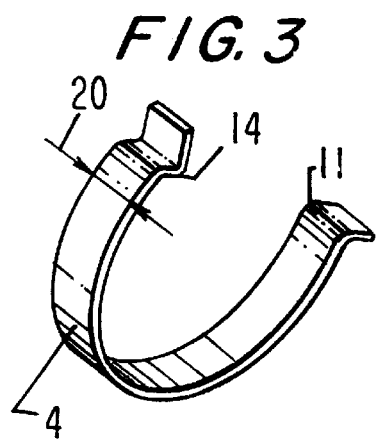

DEVICE FOR SHIFTING BICYCLE GEARS

BACKGROUND OF THE INVENTION

1. Field of the Invention

The present invention relates to devices for shifting of bicycle gears and, more particularly, to a gear-shifting device having a compact wrap spring which rotatably couples a rotary element to a notched inner housing portion.

2. Description of the Related Art

German publication DE 44 42 953 discloses a click-stop gear shift for bicycle gears. The gear shift has a notching element with notches, a detent spring having a notching projection and two projections, and a slider with different pre-bias stages for the detent spring. The two ends of the detent spring are supported by the slider, while the projection located at the center of the detent spring engages the notches in the notching element. The detent spring is arranged in an annular space of the housing. The circumferential length of this annular space exceeds that of the spring by a predetermined amount along a desired override path. This click-stop gear shift meets the following operational requirements: shifting of gears can be felt; different levels of operating force can be attained by an adjustable spring pre-bias; override paths through dead travel space exist; different rotary resistance is possible in the clockwise and counterclockwise directions by configuring the notches to have a different groove angle.

SUMMARY OF THE INVENTION

An object of the present invention is to provide a device for shifting bicycle gears which has a distinctly different rotational resistance for the clockwise and the counterclockwise directions.

Another object of the present invention is to provide a compact gear-shifting device which meets the aforementioned operating requirements and which includes a detent spring that takes up very little space at least in the radial direction of the housing.

It has been found that different notching groove angles alone are insufficient to ensure an adequate difference in the rotary resistance in the two directions. Accordingly, the gear shifting device of the present invention uses the wrap spring effect, in conjunction with the groove angles to accentuate the difference in rotary resistance.

Thus, in one rotational direction, the shift resistance experienced while pulling or drawing in the detent spring around the inner housing portion on which the spring rests can be increased in accordance with the size of the wrap angle. In the opposite rotational direction, the spring is easier to shift because the spring together with its notch-engaging projection is lifted up from the housing portion and engages an abutment in the housing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 1 is a partial sectional view of an embodiment of the gear shifting device constructed in accordance with the present invention;

FIG. 2 is a plan view of the detent spring shown in FIG. 1; and

FIG. 3 is a perspective view of the detent spring of FIG. 2.

DETAILED DESCRIPTION OF THE PRESENTLY PREFERRED EMBODIMENTS

Referring now to the drawings, and in more detail, FIGS. 1 and 2, there is shown a device for shifting bicycle gears, which may be embodied as a rotary handlebar gear shift, a frame gear shift or the like. The device includes a housing part 1, a rotary element 2 having a circumferential wall and a detent spring 4 arranged concentrically between the housing part 1 and the rotary element 2 in an annular space 5. The detent spring 4 is arcuate in shape and has a first end configured as a take-up connection such as, for example, a hook 11 and a second end configured as a projection 14. The rotary element 2 is selectively rotatable and has a recess 6 defined by a first stop 7 and a second stop 8 for limiting movement of the hook 11 disposed therein such that as the rotary element 2 is rotated back and forth, the hook 11 alternatingly strikes stops 7 and 8, thereby creating a dead travel space 10. The detent spring 4, preferably in the form of a wrap spring, extends around the housing part 1 and has a wrap diameter 16. The housing part 1 has a plurality of notches 3 formed therein. Each of the notches, corresponding to a gear shifting position, has a notching groove angle 13 and is configured to engage the projection 14 of the detent spring 4.

The detent spring 4 has a wrap angle 15 of between about 180° and 360°, preferably about 220°, which is just large enough to attain sufficient frictional engagement, during counterclockwise operation of the detent spring 4. In the clockwise operating direction of the detent spring, the detent spring 4 puts up very little or no resistance as the detent spring 4 lifts up from the wrap diameter 16 or the housing part 1 and resiliently urges the projection 14 from one notch 3 to the other notch 3. An abutment 17 arranged on the rotary element 2 at a radial distance 12 from the detent spring 4, which also influences the dead travel space 10, imparts a radially inward force against the detent spring 4 as the spring 4 lifts up during clockwise rotation of the rotary element 2. The abutment 17 is arranged at a certain angle 9 relative to the projection 14, the angle being preferably about half of the wrap angle 15. The rotary element 2, operable by a bicycle rider, is connected to a coiling device 22 for winding/unwinding a control cable 23 that exits from the gear shifting device through a shoulder 18 and connected to a derailleur.

FIG. 2 shows that the detent spring 4 has a sheet metal thickness 21. This drawing illustrates the spatial relationship of the three active points of the detent spring: the hook 11, the abutment 17 and the projection 14.

FIG. 3 depicts a perspective view of the detent spring 4 formed of a steel strip with a width 20.

The function of the inventive gear shifting device is determined primarily by the different rotational resistance encountered in the two different rotational directions of the rotary element 12. Higher forces are needed to rotate the rotary element 2 in a counterclockwise direction (as in FIG. 1) than in a clockwise direction. There are several factors that can increase the rotational resistance when the rotary element 2 is turned counterclockwise. These include the size of the wrap angle 15, the size and position of the notching groove angle 13, the configuration of the projection 14 and the embodiment of the angle at the projection 14. Factors that influence the operating forces resulting from the rotation of the rotary element 2 in a rotational direction include the strength and/or stiffness of the sheet metal as determined in part by the sheet metal thickness 21, the radial distance 12 of the abutment 17 from the detent spring 4, and the position and size of the notching groove angle 13.

The low space requirement of the detent spring 4 is advantageous, as is its simple mounting on the housing part 1. Mounting is facilitated by the pre-bias of the detent spring 4 embodied as a wrap spring, which ensures that the wrap spring 4 will not fall off after being mounted on the housing part 1.

The invention is not limited by the embodiments described above which are presented as examples only but can be modified in various ways within the scope of protection defined by the appended patent claims.

I claim:

1. A device for shifting bicycle gears, comprising:
   a housing part having a circumferential surface and a plurality of notches formed in the circumferential surface, each of the plurality of notches corresponding to a gear-shifting position;
   a rotary element having a circumferential wall and being selectively rotatable relative to the housing part, the housing part being disposed concentrically within the circumferential wall of the rotary element; and
   a detent spring configured as a wrap spring and arranged circumferentially around the housing part, the wrap spring having a wrap diameter and a wrap angle of between approximately 180° and 360°.

2. The device of claim 1, wherein the detent spring has a first end, a second end, a projection disposed at said first end for coupling the spring to the housing part, and a take-up connection disposed at said second end for coupling the spring to the rotary element.

3. The device of claim 2, wherein the take-up connection at said second end of the detent spring includes a hook in operative engagement with a recess formed in the rotary element.

4. The device of claim 3, wherein the recess in the rotary element has a first stop and a second stop for limiting movement of the hook, the first and the second stops defining a dead travel space as the hook moves therebetween during a back-and-forth rotation of the rotary element.

5. The device of claim 2, wherein the rotary element has an abutment disposed at a radial distance from an arcuate portion of the detent spring and at an angle relative to the projection.

6. The device of claim 5, wherein said angle is approximately half of the wrap angle of the detent spring.

7. The device of claim 5, wherein the distance between the abutment and the detent spring is up to 5 mm depending on a desired amount of dead travel space.

* * * * *